United States Patent
Hartmann et al.

(10) Patent No.: US 10,228,016 B2
(45) Date of Patent: Mar. 12, 2019

(54) BEARINGS

(71) Applicant: SAINT-GOBAIN PERFORMANCE PLASTICS PAMPUS GMBH, Willich (DE)

(72) Inventors: Juergen Hartmann, Willich (DE); Lukas Plioska, Nettetal (DE); Jan Arpe, Meerbusch (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 0 days.

(21) Appl. No.: 15/618,212

(22) Filed: Jun. 9, 2017

(65) Prior Publication Data

US 2017/0363140 A1 Dec. 21, 2017

Related U.S. Application Data (60) Provisional application No. 62/350,880, filed on Jun. 16, 2016.

(51) Int. Cl.
*F16C 17/10* (2006.01)
*F16C 17/04* (2006.01)
(Continued)

(52) U.S. Cl.
CPC .............. *F16C 17/04* (2013.01); *B21D 53/10* (2013.01); *F16C 11/02* (2013.01); *F16C 17/10* (2013.01);
(Continued)

(58) Field of Classification Search
CPC .... F16C 11/02; F16C 17/107; F16C 33/1095; F16C 2223/32
See application file for complete search history.

(56) References Cited

U.S. PATENT DOCUMENTS 1,645,701 A 10/1927 Hopkins
2,170,708 A 8/1939 Cordeiro
(Continued)

FOREIGN PATENT DOCUMENTS

BR 9706125 A 3/1999
DE 841087 C 6/1952
(Continued)

OTHER PUBLICATIONS

International Search Report for PCT/EP2017/064141, dated Sep. 8, 2017, 1 page.

(Continued)

*Primary Examiner* — Phillip A Johnson
(74) *Attorney, Agent, or Firm* — Abel Law Group, LLP; Chi Suk Kim (57) ABSTRACT

In an embodiment, a bearing including a generally cylindrical sidewall having a thickness, $t_{SW}$; a circumferentially extending feature projecting radially outward from the generally cylindrical sidewall, wherein the circumferentially extending feature has an axial height of at least about 2.0 $t_{SW}$; and a flange disposed at an axial end of the generally cylindrical sidewall and spaced apart from the circumferentially extending feature. In another embodiment, an assembly including a first component comprising an aperture; a second component coaxial with respect to the first component; and a bearing disposed axially between the first and second components and at least partially within the aperture of the first component, wherein the first and second components are spaced apart from one another by a distance, D, and wherein the bearing is visible from a side elevation view along the entire distance, D.

18 Claims, 7 Drawing Sheets

(51) Int. Cl.
*F16C 33/06* (2006.01)
*B21D 53/10* (2006.01)
*F16C 35/02* (2006.01)
*F16C 11/02* (2006.01)
*F16C 33/20* (2006.01)

(52) U.S. Cl.
CPC ............ *F16C 33/06* (2013.01); *F16C 33/205* (2013.01); *F16C 33/208* (2013.01); *F16C 35/02* (2013.01); *F16C 2208/02* (2013.01); *F16C 2223/32* (2013.01); *F16C 2240/60* (2013.01); *F16C 2240/70* (2013.01); *F16C 2300/02* (2013.01)

(56) References Cited

U.S. PATENT DOCUMENTS

| | | | |
|---|---|---|---|
| 2,340,423 A | 2/1944 | O'Shaughnessy, Jr. et al. | |
| 2,510,693 A | 6/1950 | Green | |
| 2,685,813 A | 8/1954 | Lampman et al. | |
| 3,009,597 A | 11/1961 | Martin et al. | |
| 3,086,072 A | 4/1963 | Forman | |
| 3,140,540 A * | 7/1964 | Greenman | B21D 39/063 29/512 |
| 3,183,394 A | 5/1965 | Hipszer et al. | |
| 3,484,931 A | 12/1969 | Lindesmith et al. | |
| 3,531,903 A | 10/1970 | Swanson | |
| 3,640,361 A | 2/1972 | Spichala | |
| 3,895,409 A | 7/1975 | Kwatonowski | |
| 3,939,529 A | 2/1976 | Davis | |
| 4,030,003 A | 6/1977 | Wright et al. | |
| 4,156,049 A | 5/1979 | Hodes et al. | |
| 4,202,243 A | 5/1980 | Leonhardt | |
| 4,258,089 A | 3/1981 | Anderson et al. | |
| 4,388,744 A | 6/1983 | Pantke et al. | |
| 4,405,256 A | 9/1983 | King, Jr. | |
| 4,409,354 A | 10/1983 | Namba et al. | |
| 4,478,544 A | 10/1984 | Strand | |
| 4,653,139 A | 3/1987 | Vollberg et al. | |
| 4,688,317 A | 8/1987 | Matuschek | |
| 4,721,406 A | 1/1988 | Davis | |
| 4,812,367 A | 3/1989 | Bickle | |
| 4,897,439 A | 1/1990 | Rau et al. | |
| 4,914,146 A | 4/1990 | Honda et al. | |
| 5,009,557 A | 4/1991 | Dessirier | |
| 5,009,959 A | 4/1991 | Matsushita et al. | |
| 5,015,136 A | 5/1991 | Vetter et al. | |
| 5,024,881 A | 6/1991 | Matucha et al. | |
| 5,033,900 A | 7/1991 | Pine | |
| 5,274,921 A | 1/1994 | Kawagoe et al. | |
| 5,573,846 A | 11/1996 | Harig et al. | |
| 5,729,882 A | 3/1998 | Travis | |
| 5,860,780 A | 1/1999 | Lenac et al. | |
| 6,272,728 B1 | 8/2001 | Lenac et al. | |
| 6,282,792 B1 | 9/2001 | Damouri et al. | |
| 6,966,699 B2 | 11/2005 | Satoh | |
| 7,303,366 B2 * | 12/2007 | Smith | F16B 19/1054 411/34 |
| 8,602,653 B2 | 12/2013 | Heshmat | |
| 2011/0049829 A1 | 3/2011 | Migliore et al. | |
| 2011/0262064 A1 | 10/2011 | Burgeff et al. | |

FOREIGN PATENT DOCUMENTS

| | | |
|---|---|---|
| DE | 4417279 A2 | 11/1995 |
| DE | 69711820 T2 | 11/2002 |
| EP | 0846876 A2 | 6/1998 |
| EP | 0846876 A3 | 8/1998 |
| EP | 0846876 B1 | 4/2002 |
| EP | 1582275 A1 | 10/2005 |
| ES | 2176612 T3 | 12/2002 |
| JP | H10169621 A | 6/1998 |
| KR | 100242907 B1 | 3/2000 |

OTHER PUBLICATIONS

"Aluminum MXL Pulley—Dual Flange," Inventables®, https://www.inventables.com/technologies/aluminum-mxl-pulley-dual-flange.

* cited by examiner

BEARINGS

CROSS-REFERENCE TO RELATED APPLICATION(S)

This application claims priority under 35 U.S.C. § 119(e) to U.S. Patent Application No. 62/350,880 entitled "BEARINGS," by Juergen Hartmann et al., filed Jun. 16, 2016, which is assigned to the current assignee hereof and incorporated herein by reference in its entirety.

FIELD OF THE DISCLOSURE

The present disclosure relates to bearings, and more particularly to plain bearings.

RELATED ART

Bearings are typically used in assemblies for rotatably, pivotably, or slidably fastening multiple components to one another. Bearings generally reduce friction between moving parts, permitting more efficient passage of energy than otherwise achievable. Industries which utilize bearings continue to demand improved bearing performance and bearings capable of operating in different environments.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing arts.

A bearing in accordance with one or more of the embodiments described herein can generally include a sidewall, a feature projecting radially from the sidewall, and a flange disposed at an axial end of the sidewall. In an embodiment, the feature projects radially outward from the sidewall. In another embodiment, the feature projects radially inward from the sidewall. The feature can be axially spaced apart from the flange by an axial distance, D, permitting a predetermined spacing between two components engaged to the bearing.

Figure 1:
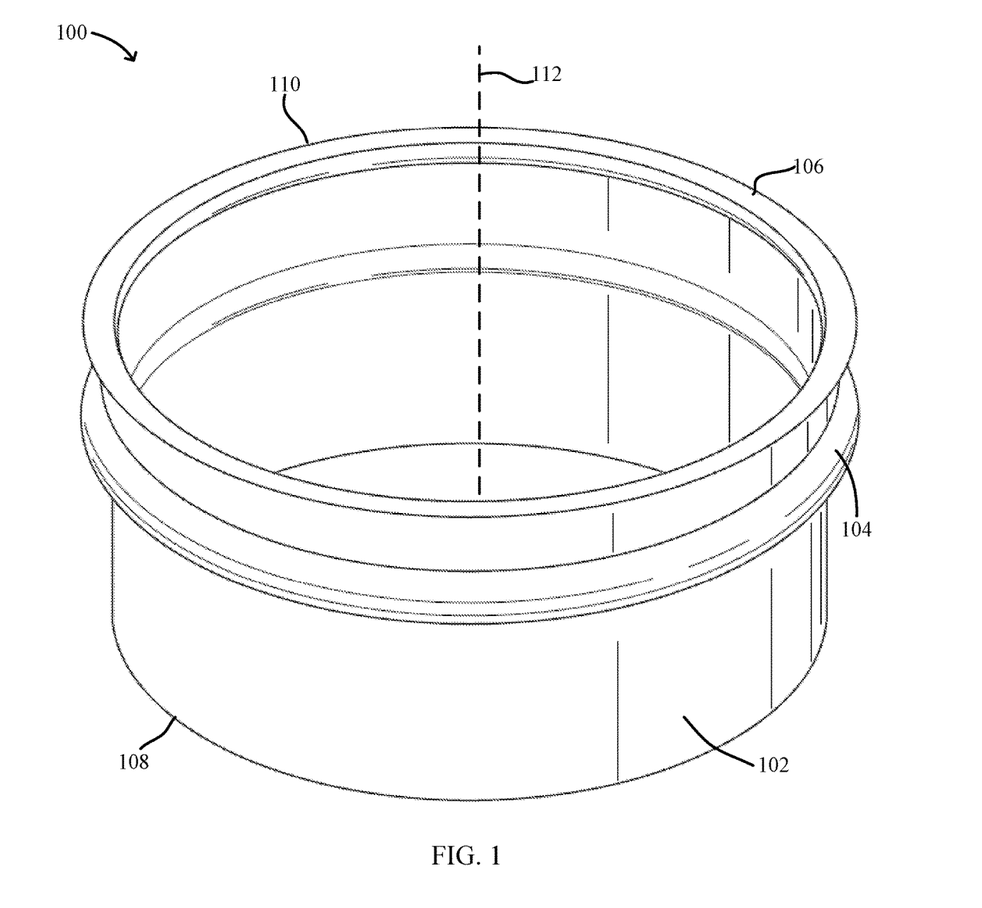
FIG. 1 includes a perspective view of a bearing in accordance with an embodiment.

FIG. 1 illustrates a bearing 100 including a sidewall 102, a feature 104, and a flange 106. The sidewall 102 can be generally cylindrical, defining an aperture extending between opposite axial ends 108 and 110 of the bearing 100. As used herein, a "generally cylindrical sidewall" refers to a sidewall having an axial length and two axial ends which, when the axial ends are closed, occupies at least 80% of a best fit cylinder, at least 95% of a best fit cylinder, or at least 99% of a best fit cylinder. In an embodiment, the bearing 100 can be formed from a single sheet of material, as described in greater detailed below.

The feature 104 can extend around at least a portion of the sidewall 102 and is spaced apart from axial ends 108 and 110 of the sidewall 102. In an embodiment, the feature 104 extends around at least 10% of the circumference of the sidewall 102, at least 25% of the circumference of the sidewall 102, at least 75% of the circumference of the sidewall 102, or at least 99% of the circumference of the sidewall 102. In a particular embodiment, the feature 104 extends around the entire (i.e., 100%) circumference of the sidewall 102 continuously. The feature 104 can include a ridge, a dimple, a projection, a tine, or any other radially extending feature. In an embodiment, the feature 104 includes only one radially extending feature extending around at least a portion of the circumference of the sidewall 102. In another embodiment, the feature 104 includes a plurality of radially extending features spaced apart from one another around the circumference of the sidewall 102. In a particular embodiment, the plurality of radially extending features can extend along a line generally perpendicular to a central axis 112 of the bearing 100 and extending around the circumference of the bearing 100. In another particular embodiment, the plurality of features can be equally spaced apart. In yet a further particular embodiment, the plurality of features can be non-uniformly spaced apart such that a distance between two features of a first set of features is different from a distance between two features of a second set of features.

The flange 106 extends around at least a portion of the sidewall 102 at one of the axial ends 108 or 110 of the sidewall 102. In an embodiment, the flange 106 extends around at least 10% of the circumference of the sidewall 102, at least 25% of the circumference of the sidewall 102, at least 75% of the circumference of the sidewall 102, or at least 99% of the circumference of the sidewall 102. In a particular embodiment, the flange 106 extends around the entire (e.g., 100%) circumference of the sidewall 102. Similar to the above-described feature 104, the flange 106 can include one radially extending flange extending around at least a portion of the circumference of the sidewall 102. In another embodiment, the flange 106 can include a plurality of discrete flange portions extending radially from the sidewall 102. The discrete flange portions can be circumferentially spaced apart from one another. The discrete flange portions can all share a same relative angle or have different relative angles with respect to the central axis 112. In a particular embodiment, the discrete flange portions can be equally spaced apart. In another particular embodiment, the discrete flange portions can be non-uniformly spaced apart such that a distance between two discrete flange portions of a first set of flange portions is different from a distance between two discrete flange portions of a second set of flange portions.

In an embodiment, the feature 104 and flange 106 can extend a same circumferential distance around the sidewall 102. For example, the feature 104 and flange 106 can both extend around 100% of the circumferential length of the sidewall 102. In another example, the feature 104 and flange 106 can both extend around 50% of the circumferential length of the sidewall 102, around 75% of the circumferential length of the sidewall 102, or any other suitable circumferential distance therealong. In another embodiment, the feature 104 and flange 106 can extend different circumferential distances around the sidewall 102. That is, the feature 104 and flange 106 can have different circumferential lengths with respect to one another. For example, the feature 104 can extend around 50% of the circumference of the sidewall 102 and the flange 106 can extend around 75% of the circumference of the sidewall 102, or the feature 104 can extend around 60% of the circumference of the circumference of the sidewall 102 and the flange 106 can extend around 40% of the circumference of the sidewall 102.

Figure 2:
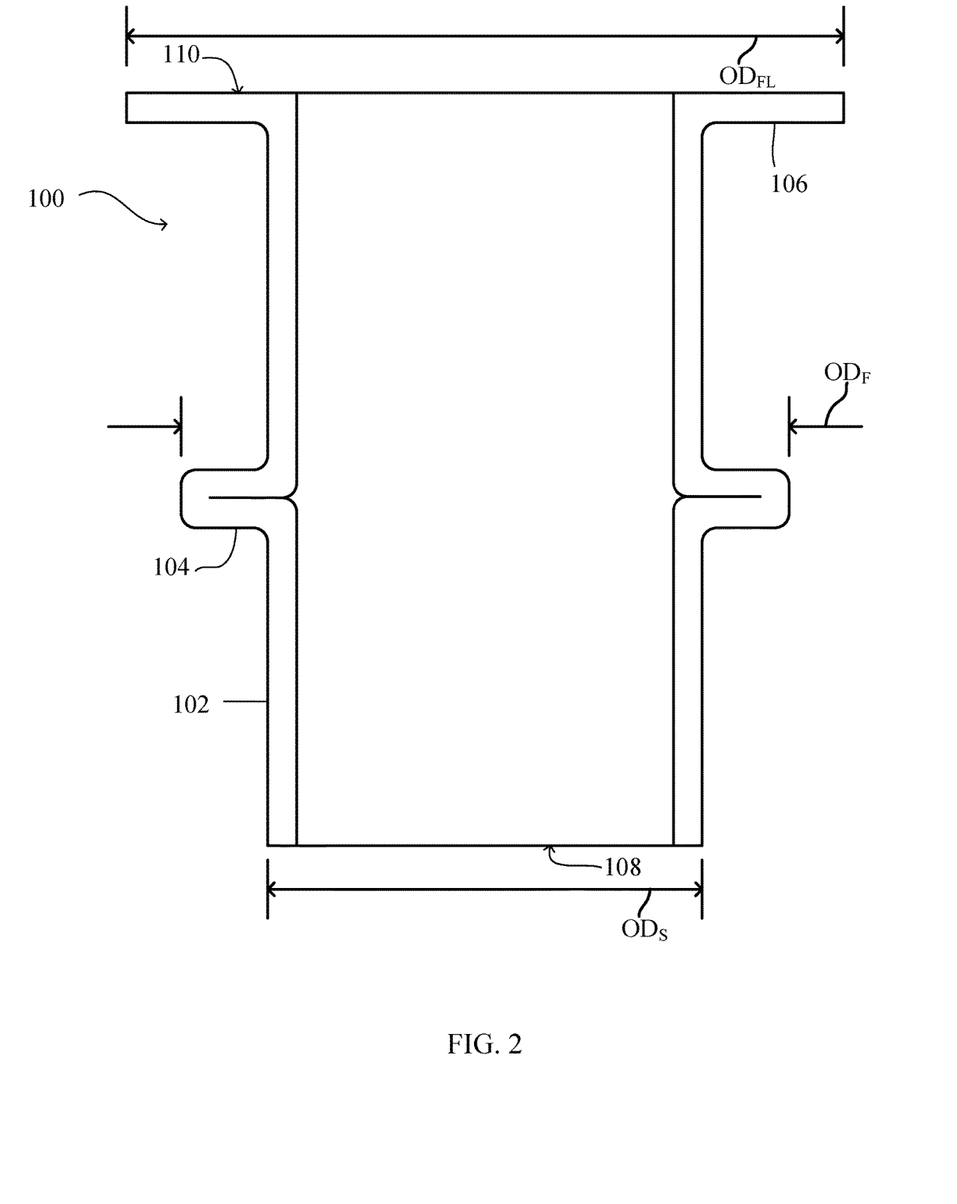
FIG. 2 includes a cross-sectional side view of the bearing of FIG. 1 as seen along Line A-A.

Referring to FIG. 2, in an embodiment the feature 104 can have an outermost diameter, $OD_F$, greater than an outermost diameter, $OD_S$, of the sidewall 102. In a particular embodiment, $OD_F$ can be at least 1.01 $OD_S$, at least 1.05 $OD_S$, at least 1.1 $OD_S$, or at least 1.25 $OD_S$. In another embodiment, $OD_F$ can be no greater than 3.0 $OD_S$, no greater than 2.0 $OD_S$, or no greater than 1.5 $OD_S$. In a further embodiment, $OD_F$ can be within a range between and including 1.01 $OD_S$ and 3.0 $OD_S$, in a range between and including 1.01 $OD_S$ and 2.0 $OD_S$, or in a range between and including 1.01 $OD_S$ and 1.5 $OD_S$. In a particular embodiment, $OD_F$ is at least 0.1 mm, at least 1 mm, at least 5 mm, at least 10 mm, at least 20 mm, at least 50 mm, at least 75 mm, at least 100 mm, or at least 150 mm. In another embodiment, $OD_F$ is no greater than 1000 mm.

In an embodiment, the flange 106 can have an outermost diameter, $OD_{FL}$, different than the outermost diameter, $OD_S$, of the sidewall 102. In a particular embodiment, $OD_{FL}$ can be at least 1.01 $OD_S$, at least 1.05 $OD_S$, at least 1.1 $OD_S$, or at least 1.25 $OD_S$. In another embodiment, $OD_{FL}$ can be no greater than 5.0 $OD_S$, no greater than 3.0 $OD_S$, or no greater than 2.0 $OD_S$. In a further embodiment, $OD_{FL}$ can be within a range between and including 1.01 $OD_S$ and 5.0 $OD_S$, in a range between and including 1.01 $OD_S$ and 3.0 $OD_S$, or in a range between and including 1.01 $OD_S$ and 2.0 $OD_S$. In a particular embodiment, $OD_{FL}$ is at least 0.1 mm, at least 1 mm, at least 5 mm, at least 10 mm, at least 20 mm, at least 50 mm, at least 75 mm, at least 100 mm, or at least 150 mm. In another embodiment, $OD_{FL}$ is no greater than 1000 mm.

In an embodiment, the flange 106 and feature 104 can extend a same radial distance from the sidewall 102. In another embodiment, the flange 106 and feature 104 can extend different radial distances from the sidewall 102. For example, the flange 106 can extend a greater radial distance from the sidewall 102 than the feature 104. As illustrated in FIG. 2, the outermost diameter, $OD_{FL}$, of the flange 106 is greater than the outermost diameter, $OD_F$, of the feature 104. In an embodiment $OD_{FL}$ can be at least 1.01 $OD_F$, at least 1.05 $OD_F$, at least 1.1 $OD_F$, at least 1.25 $OD_F$, or at least 1.5 $OD_F$. In another embodiment, $OD_{FL}$ can be no greater than 3.0 $OD_F$, no greater than 2.5 $OD_F$, no greater than 2.0 $OD_F$, or no greater than 1.75 $OD_F$. Moreover, in an embodiment, $OD_{FL}$ can be in a range between and including 1.01 $OD_F$ and 3.0 $OD_F$. In an embodiment, $OD_{FL}$ is within 50% $OD_F$, within 40% $OD_F$, within 30% $OD_F$, within 20% $OD_F$, or within 10% $OD_F$. Thus, for example, embodiments with an $OD_{FL}$ is 20 mm, can have an $OD_F$ between 10 mm and 30 mm.

In another embodiment, $OD_{FL}$ can be less than $OD_F$. For example, $OD_{FL}$ can be no greater than 0.99 $OD_F$, no greater than 0.95 $OD_F$, or no greater than 0.75 $OD_F$. In an embodiment, $OD_{FL}$ can be no less than 0.25 $OD_F$, no less than 0.5 $OD_F$, or no less than 0.7 $OD_F$. Several factors can be considered when determining proper ratios between $OD_S$, $OD_F$, and $OD_{FL}$. For example, loading force, dimensional tolerances, frictional requirements, and housing size limitations can factor into $OD_S$, $OD_F$, and $OD_{FL}$.

Figure 3:
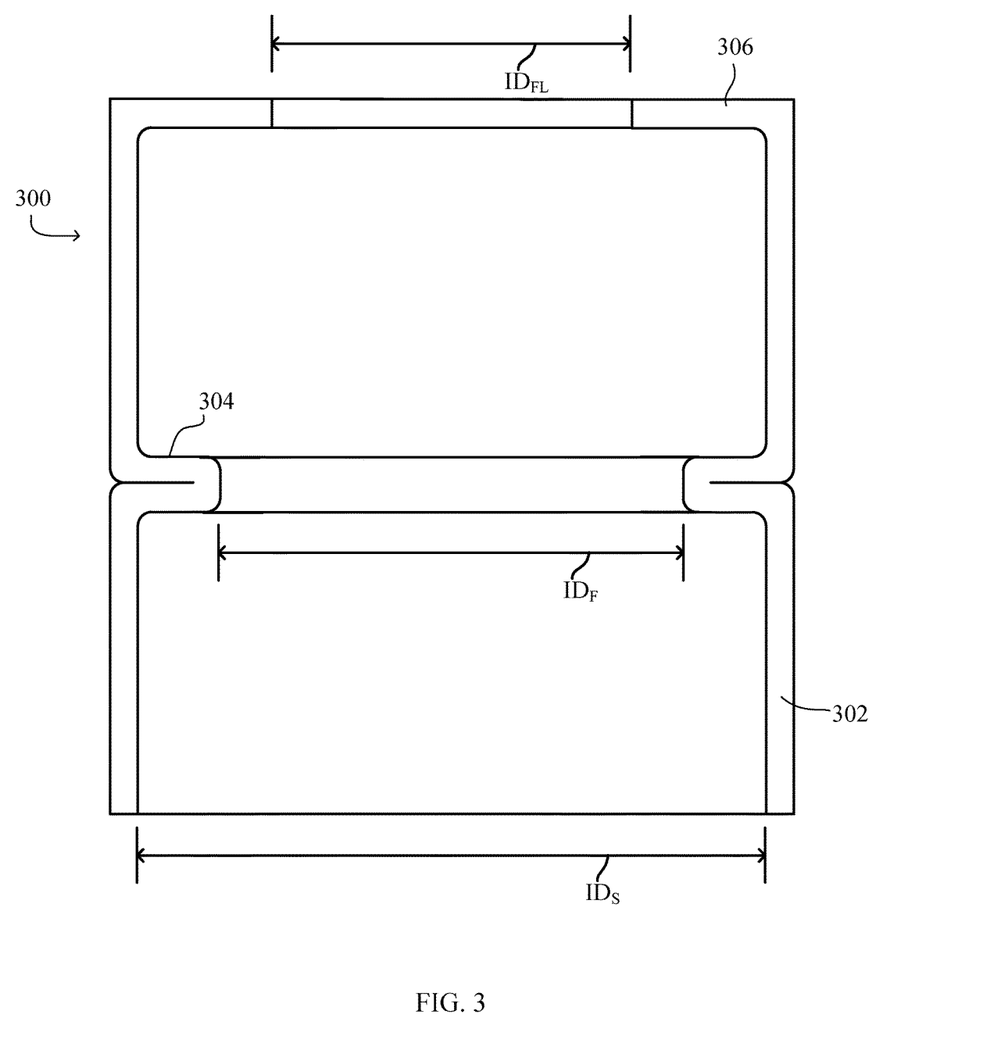
FIG. 3 includes a cross-sectional side view of a bearing in accordance with another embodiment.

FIG. 3 illustrates a bearing 300 having an inwardly extending flange 306 and an inwardly extending feature 304. In an embodiment, the feature 304 has an innermost diameter, $ID_F$, less than an innermost diameter, $ID_S$, of the sidewall 302. In a particular embodiment, $ID_F$ can be less than 0.99 $ID_S$, less than 0.95 $ID_S$, less than 0.9 $ID_S$, or less than 0.75 $ID_S$. In another embodiment, $ID_F$ is greater than 0.1 $ID_S$, greater than 0.2 $ID_S$, or greater than 0.4 $ID_S$. In a further embodiment, $ID_F$ can be within a range between and including 0.1 $ID_S$ and 0.99 $ID_S$, in a range between and including 0.25 $ID_S$ and 0.99 $ID_S$, or in a range between and including 0.5 $ID_S$ and 0.95 $ID_S$.

In an embodiment, the flange 306 can have an innermost diameter, $ID_{FL}$, less than an innermost diameter, $ID_S$, of the sidewall 302. In a particular embodiment, $ID_{FL}$ can be less than 0.99 $ID_S$, less than 0.95 $ID_S$, less than 0.9 $ID_S$, or less than 0.75 $ID_S$. In another embodiment, $ID_{FL}$ is greater than 0.1 $ID_S$, greater than 0.2 $ID_S$, or greater than 0.4 $ID_S$. In a further embodiment, $ID_{FL}$ can be within a range between and including 0.1 $ID_S$ and 0.99 $ID_S$, in a range between and including 0.25 $ID_S$ and 0.99 $ID_S$, or in a range between and including 0.5 $ID_S$ and 0.95 $ID_S$.

In an embodiment, the flange 306 and feature 304 can extend a same radial distance from the sidewall 302. In another embodiment, the flange 306 and feature 304 can extend different radial distances from the sidewall 302. For example, the flange 306 can extend a greater radial distance from the sidewall 302 than the feature 304. As illustrated in FIG. 3 the innermost diameter, $ID_{FL}$, of the flange 306 is less than the innermost diameter, $ID_F$, of the feature 304. In an embodiment, $ID_{FL}$ can be no greater than 0.99 $ID_F$, no greater than 0.9 $ID_F$, or no greater than 0.75 $ID_F$. In another embodiment, $ID_{FL}$ can be no less than 0.25 $ID_F$, no less than 0.5 $ID_F$, or no less than 0.7 $ID_F$.

In a non-illustrated embodiment, the feature and flange of the bearing can extend in different radial directions from the sidewall. For example, the feature can extend radially inward and the flange radially outward. Conversely, the feature can extend radially outward and the flange radially inward. The particular radial configuration is dependent on the particular application and component configuration in the assembled state, as described in greater detail below.

Figure 4:
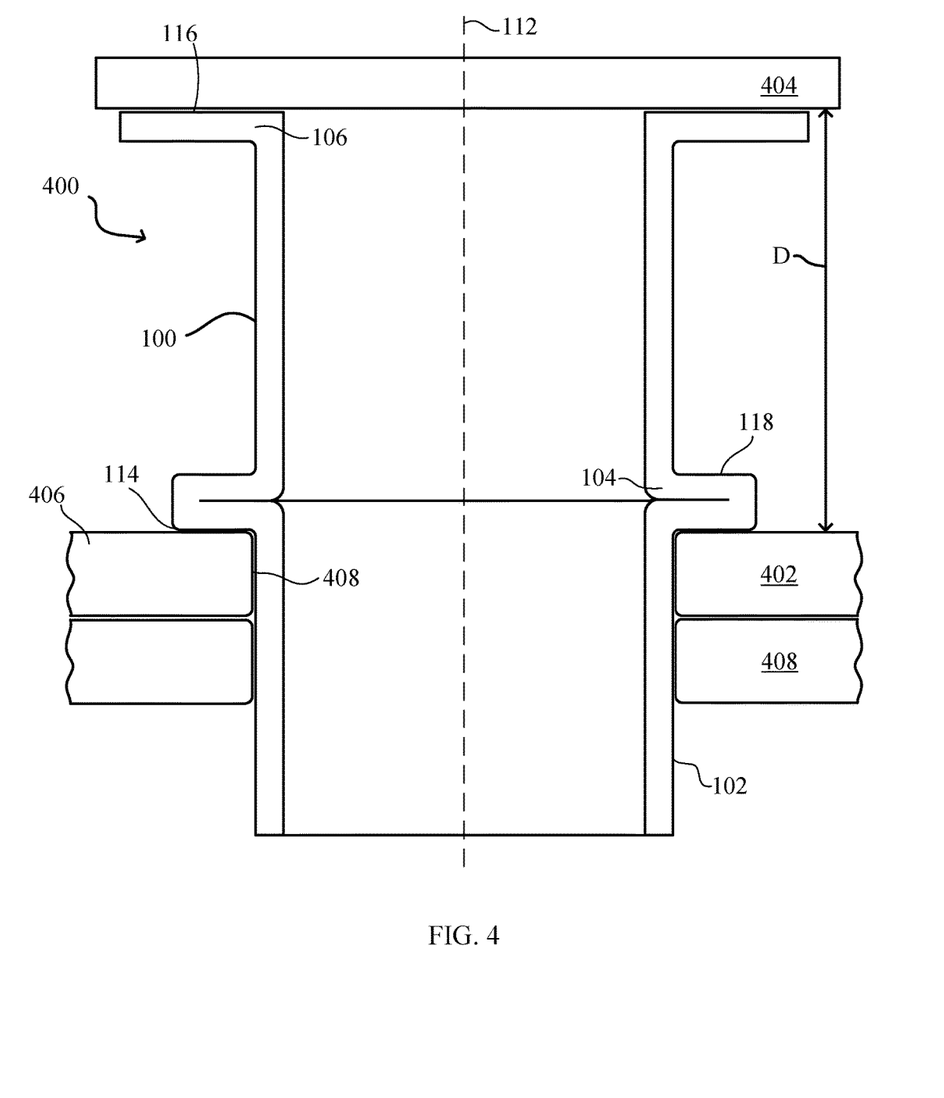
FIG. 4 includes a cross-sectional side view of an assembly including a bearing in accordance with an embodiment.

Referring to FIG. 4, the bearing 100 can be used in an assembly 400 to separate a first component 402 from a second component 404 by a distance, D. In an embodiment, D is at least 0.01 mm, at least 0.1 mm, at least 1 mm, at least 2 mm, at least 3 mm, at least 4 mm, at least 5 mm, at least 10 mm, at least 20 mm, at least 50 mm, or at least 100 mm. In another embodiment, D is no greater than 1000 mm, no greater than 500 mm, or no greater than 250 mm. Separation between two components (e.g., components 402 and 404) using the bearing 100 may be desirable, for example, in applications where two components are rotatable with respect to one another and require a fixed distance therebetween. Such applications include automotive, aeronautical, machining, and other related fields where components are moveable with respect to one another.

As illustrated in FIG. 4, the first component 402 includes a body 406 defining an aperture 408. The bearing 100 is insertable into the aperture 408 such that the bearing 100 is at least partially disposed therein in the assembled state. In an embodiment, the diameter of the aperture 408 of the first component 402 is less than the outermost diameter, $OD_F$, of the feature 104. For example, the diameter of the aperture 408 can be no greater than 99.9% $OD_F$, no greater than 99% $OD_F$, no greater than 95% $OD_F$, no greater than 90% $OD_F$, no greater than 85% $OD_F$, no greater than 80% $OD_F$, no greater than 75% $OD_F$, no greater than 70% $OD_F$, no greater than 60% $OD_F$, no greater than 50% $OD_F$, or no greater than 40% $OD_F$. Meanwhile, the diameter of the aperture 408 is greater than the diameter, $OD_S$, of the sidewall 102. In such a manner, the feature 104 can contact the first component 402 in the assembled state and prevent the first component 402 from sliding closer than a distance, D, to an outermost surface 116 of the flange 106.

In a particular embodiment, the first and second components 402 and 404 can be coaxially aligned with one another and with respect to the central axis 112 of the bearing 100. As illustrated, the first component 402 is disposed adjacent to a first axial end 114 of the feature 104 and the second component 404 is disposed adjacent to the outermost surface 116 of the flange 106. In a particular embodiment, the second component 404 can contact the outermost surface 116 of the flange 106. The flange 106 can be closer to a second axial end 118 of the feature 104 than the first axial end 114 thereof.

A third component 408 can be positioned, for example, adjacent the first component 402. In an embodiment, the third component 408 can be rotatable with respect to either, or both, the first and second components 402 or 404. Additional components can be positioned along the bearing 100 as required. In an embodiment, one or more additional features (not illustrated) can be formed along the sidewall 102 to further space apart additional components for particular applications.

In an embodiment, in the assembled state (i.e., after installation of the first and second components 402 and 404), at least a portion of the sidewall 102 is visible from a side view along the distance, D, between the first and second components 402 and 404. In another embodiment, at least a portion of the flange 106 is visible from a side view in the assembled state. In another embodiment, at least a portion of the feature 104 is visible from a side view in the assembled state.

Figure 5:
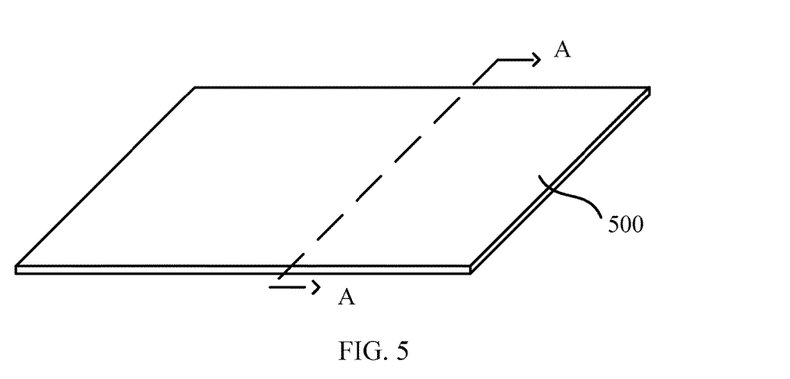
FIG. 5 includes a perspective view of a sheet of material.
Figure 6:
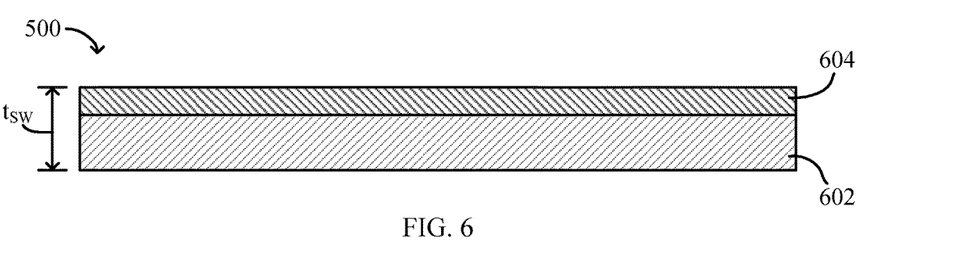
FIG. 6 includes a cross-sectional side view of the sheet of material as seen along Line B-B in FIG. 5.

FIG. 5 illustrates a sheet of material 500 used to form the bearing 100. FIG. 6 illustrates a cross-sectional view of the sheet of material 500 as viewed along Line A-A in FIG. 5. The sheet of material 500 can include a substrate 602 and a low friction layer 604 disposed along at least a portion of the substrate 602. In a particular embodiment, the substrate 602 defines first and second major surfaces spaced apart from each other by a thickness. The low friction layer 604 is disposed along one or both of the major surfaces of the substrate 602. The low friction layer 604 can be disposed along the entire first major surface, the entire second major surface, or a combination thereof.

As illustrated, the substrate 602 and low friction layer 604 can have different thicknesses. For example, the low friction layer 604 can have a thickness that is less than the thickness of the substrate 602. In another embodiment, the substrate 602 and low friction layer 604 can have the same relative thicknesses. Together, the substrate 602 and low friction layer 604 define a thickness, $t_{SW}$, of the sheet of material 500 and the later formed sidewall 102.

The substrate 602 can be formed from a resilient material, such as a metal. In a particular embodiment, the substrate 602 is formed from steel. In a more particular embodiment, the substrate 602 is formed from a spring steel. The low friction layer 604 is formed from a low friction material (i.e., a material having a low coefficient of friction). Exemplary materials include polymers, and more particularly fluoropolymers. Exemplary materials include, for example, polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer, polyacetal, polybutylene terephthalate, polyimide, polyetherimide, polyetheretherketone (PEEK), polyethylene, polysulfone, polyamide, polyphenylene oxide, polyphenylene sulfide (PPS), polyurethane, polyester, or any combination thereof. In an embodiment, the low friction layer 604 can include a filler such as glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone ($PPSO_2$), liquid crystal polymers (LCP), aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

The substrate 602 and low friction layer 604 can be coupled together to form the sheet of material 500. In an embodiment, the substrate 602 and low friction layer 604 can be coupled together using a lamination process including the application of heat, pressure, or adhesive. In a particular embodiment, the substrate 602 and low friction layer 604 are coupled together by an adhesive (not illustrated), such as a hot melt adhesive. Examples of suitable adhesives include fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C., even higher than 300° C.

Figure 7:
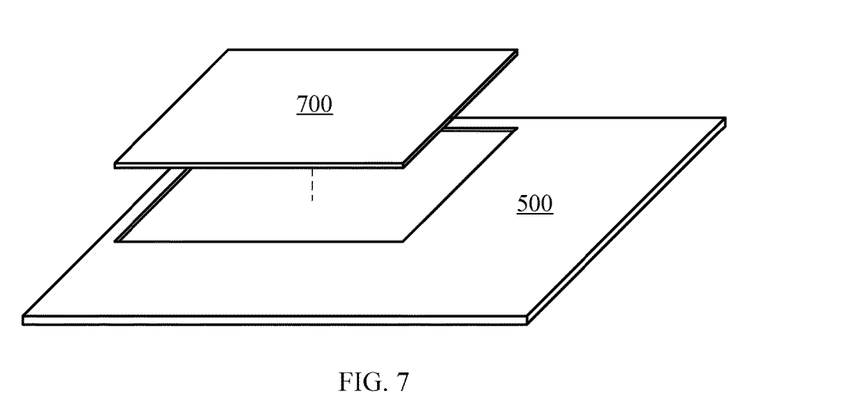
FIG. 7 includes a perspective view of a step of forming a blank from the sheet of material.
Figure 8:
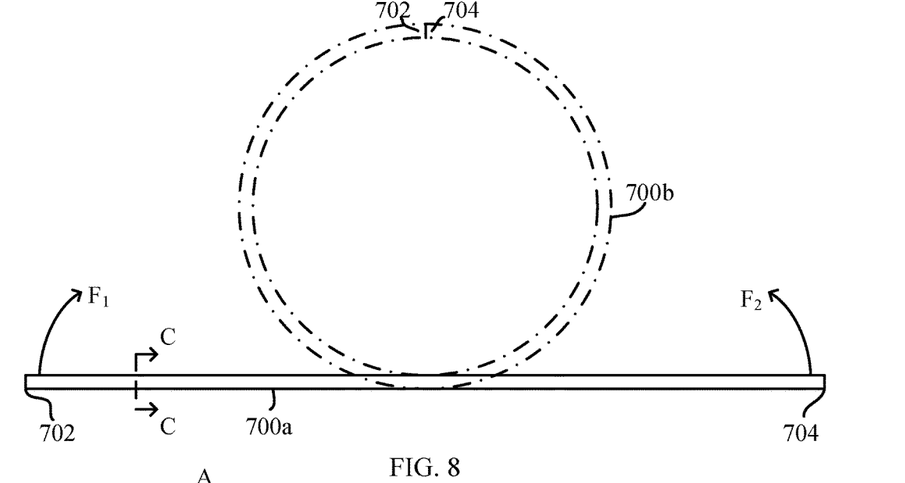
FIG. 8 includes a top view of the blank before and after forming a generally cylindrical sidewall of the bearing.

As illustrated in FIG. 7, a blank 700 can be formed from the sheet of material 500. The blank 700 can be stamped, pressed, cut, or otherwise formed from the sheet of material 500. After forming, the blank 700 can be shaped to have a generally cylindrical profile. FIG. 8 illustrates a top view of the blank 700 before shaping 700a and after shaping 700b. The shaped blank 700b can be formed by bringing ends 702 and 704 of the blank 700a toward one another until the ends 702 and 704 are adjacent one another. A die or template can be used in shaping to promote greater cylindricality in the shaped state. Generally, forces F$_1$ and F$_2$ applied to the ends 702 and 704 cause the blank 700a to form a generally cylindrical sidewall. The blank 700 can be oriented such that the low friction layer 604 (FIG. 6) is along an inner surface of the sidewall 102, an outer surface of the sidewall 102, or a combination thereof.

In an embodiment, the resulting gap 706 in the shaped blank 700b between ends 702 and 704 can result in a split bearing. Split bearings may permit greater operational functionality by allowing material flexure during assembly. In another embodiment, the gap 706 can be closed, for example, by welding, adhesion, one or more mechanical fasteners, a puzzle-lock feature, another suitable method, or any combination thereof. Closed bearings (i.e., bearings with closed gaps) may be more resilient and capable of handling higher loading force than split bearings, but may be difficult to install or operate in certain environments.

Figure 9:
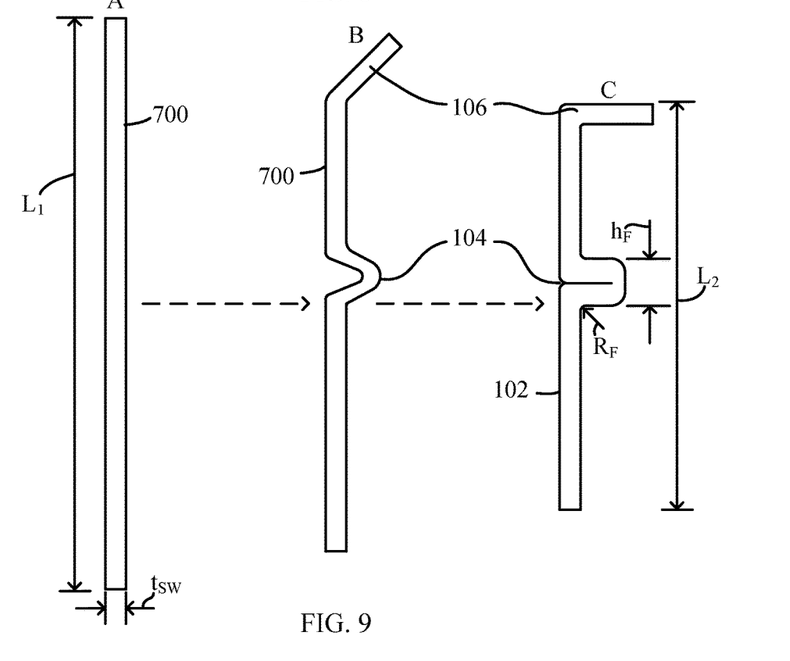
FIG. 9 includes a cross-sectional side view of the bearing as seen along Line C-C before, during, and after formation of a flange and feature.

Prior to, after, or both prior to and after forming the generally cylindrical sidewall 102, the feature 104 and flange 106 can be formed in the blank 700. In an embodiment, the feature 104 is formed prior to forming the flange 106. In another embodiment, the flange 106 is formed prior to forming the feature 104. In yet a further embodiment, the feature 104 and flange 106 are formed contemporaneously. FIG. 9 illustrates, as viewed along Line C-C in FIG. 8, the formation of both the feature 104 and flange 106, however, it should be understood that the formation thereof can occur at separate times, successively, or otherwise.

As illustrated, the blank 700 starts with a generally rectangular cross section (A) having thickness, $t_{SW}$; the flange 106 and feature 104 are shaped (B) by deforming the blank 700; and the resulting sidewall 102 includes a formed flange 106 and feature 104 (C). While the shaping step (B) is illustrated as simultaneously forming the flange 106 and feature 104, in an embodiment the flange 106 can be formed prior to formation of the feature 104. In another embodiment, the feature 104 can be formed prior to formation of the flange 106. In a further embodiment, the flange 106 can be at least partially formed prior to formation of the feature 104. In yet another embodiment, the feature 104 can be at least partially formed prior to formation of the flange 106.

As illustrated, the axial length of the bearing 100 can change during formation of the feature 104 or flange 106. That is, the blank 700 has an initial axial length, $L_1$, prior to forming the feature 104 and flange 106 which lessens to a final axial length, $L_2$, as measured after forming the feature 104 and flange 106. In an embodiment, $L_1$ is at least 1.01 $L_2$, at least 1.02 $L_2$, at least 1.03 $L_2$, at least 1.04 $L_2$, at least 1.05 $L_2$, at least 1.1 $L_2$, at least 1.2 $L_2$, at least 1.3 $L_2$, at least 1.4 $L_2$, or even at least 1.5 $L_2$. In another embodiment, $L_2$ is no greater than 3.0 $L_2$, or no greater than 2.0 $L_2$.

In an embodiment, the feature 104 has an axial height, $h_F$, that is different than the thickness, $t_{SW}$, of the sidewall 102. In an embodiment, the axial height, $h_F$, of the feature 104 is greater than the thickness, $t_{SW}$ of the sidewall 102. For example, $h_F$ can be at least 1.01 $t_{SW}$, at least 1.5 $t_{SW}$, at least 2.0 $t_{SW}$, or at least about 5.0 $t_{SW}$. In a particular embodiment, $h_F$ is approximately (i.e., ±10%) 2.0 $t_{SW}$ as the feature 104 can be formed with a two-ply sidewall thickness. Slight tolerance in axial height, $h_F$, can occur as a result of material deformation or internal material stress within the feature 104.

In a non-limiting embodiment, the feature 104 has a radius of curvature, $R_F$, or no radius of curvature along the first axial end 114 to promote surface contact between the first axial end 114 and the first component 402 (FIG. 4). For example, $R_F$ can be less than 10 mm, less than 5 mm, less than 2 mm, less than 1 mm, or less than 0.5 mm. In other embodiments, the junction between the sidewall and the first axial end 114 of the feature 104 can have any radius of curvature, $R_F$.

Figure 10:
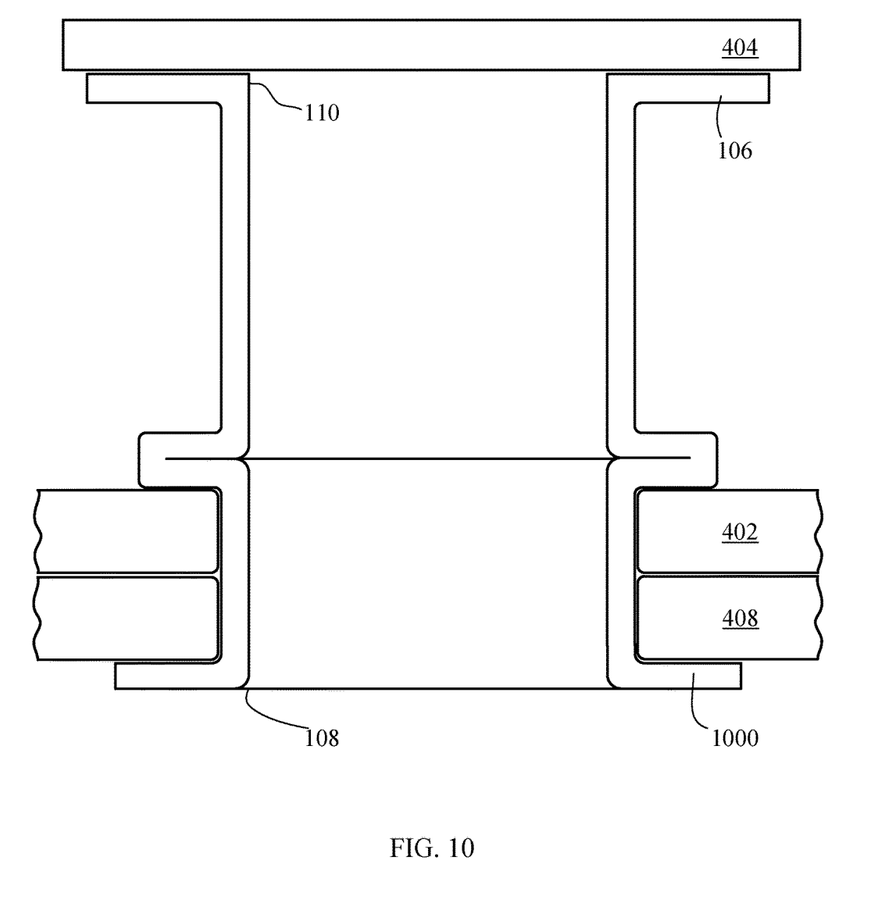
FIG. 10 includes a cross-sectional side view of an assembly in accordance with another embodiment.

After installation of the first and (optional) third components 402 and 408 relative to the bearing 100, the axial end 108 of the bearing 100 can be flanged to secure the first and third components 402 and 408 at fixed distances relative to one another and the second component 404. It is noted that such step is optional and may be omitted in certain embodiments where flanging is not necessary. In an embodiment, the resulting flange 1000 can have similar attributes to the flange 106 at axial end 110. For example, the flange 1000 can have a same outermost diameter as the flange 106, a same radius of curvature as the flange 106, or any other similar characteristic. In another embodiment, the flange 1000 can be different than the flange 106. For example, the outermost diameter of the flange 1000 can be different than the flange 106. In another embodiment, the flange 1000 can include a plurality of discrete flange portions while flange 106 includes a continuous flange. In yet a further embodiment, the flange 1000 can include a continuous flange while flange 106 includes a plurality of discrete flange portions.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A bearing comprising:
  a generally cylindrical sidewall having a thickness, $t_{SW}$;
  a feature projecting radially outward from the generally cylindrical sidewall, wherein the feature has an axial height of at least about 2.0 $t_{SW}$; and
  a flange disposed at an axial end of the generally cylindrical sidewall and spaced apart from the feature.

Embodiment 2. An assembly comprising:
  a first component;

a second component coaxial with respect to the first component; and
a bearing comprising:
a generally cylindrical sidewall,
a feature projecting radially outward from the sidewall, the feature having a first axial end and a second axial end, and
a flange disposed at an axial end of the generally cylindrical sidewall, wherein the flange is closer to the second axial end of the feature than the first axial end of the feature, and wherein an outermost surface of the flange is spaced apart from the first axial end of the feature by a distance, D, as measured in a direction parallel with a central axis of the bearing,
wherein the first component is disposed adjacent to the first axial end of the feature, wherein the second component is disposed adjacent to the outermost surface of the flange, and wherein the second component is spaced apart from the first component by the distance, D.

Embodiment 3. The assembly of embodiment 2, wherein the first component comprises a body defining an aperture, and wherein the bearing is at least partially disposed in the aperture.

Embodiment 4. The assembly of embodiment 3, wherein the diameter of the aperture is less than an outermost diameter of the feature.

Embodiment 5. The assembly of embodiment 4, wherein the diameter of the aperture is no greater than 99.9% the outermost diameter of the feature, no greater than 99% the outermost diameter of the feature, no greater than 95% the outer diameter of the feature, no greater than 90% the outer diameter of the feature, or no greater than 75% the outer diameter of the feature.

Embodiment 6. The assembly of any one of embodiments 2-5, wherein the first component contacts the first axial end of the feature.

Embodiment 7. The assembly of any one of embodiments 2-6, wherein the second component contacts the outermost surface of the flange.

Embodiment 8. The assembly of any one of embodiments 2-7, wherein the first and second components are moveable with respect to one another.

Embodiment 9. The assembly of any one of embodiments 2-8, wherein the first and second components are rotatable with respect to one another.

Embodiment 10. The bearing or assembly of any one of the preceding embodiments, wherein the generally cylindrical sidewall comprises a substrate and a low friction layer disposed along at least a portion of the substrate.

Embodiment 11. The bearing or assembly of embodiment 10, wherein the substrate has first and second major surfaces spaced apart from each other by a distance, and wherein the low friction layer is disposed along one of the first and second major surfaces.

Embodiment 12. The bearing or assembly of embodiment 11, wherein the low friction layer is disposed along the entire first major surface, the entire second major surface, or a combination thereof.

Embodiment 13. The bearing or assembly of any one of embodiments 10-12, wherein the low friction layer is disposed along an inner surface of the generally cylindrical sidewall, wherein the low friction layer is disposed along an outer surface of the generally cylindrical sidewall, or a combination thereof.

Embodiment 14. The bearing or assembly of any one of embodiments 10-13, wherein the low friction layer comprises a polymer, such as a fluoropolymer.

Embodiment 15. The bearing or assembly of any one of the preceding embodiments, wherein the feature has an outermost diameter, $OD_F$, wherein the flange has an outermost diameter, $OD_{FL}$, and wherein $OD_{FL}$ is within 50% $OD_F$, within 40% $OD_F$, within 30% $OD_F$, within 20% $OD_F$, or within 10% $OD_F$.

Embodiment 16. The bearing or assembly of embodiment 15, wherein $OD_F$ is approximately equal to $OD_{FL}$.

Embodiment 17. The bearing or assembly of any one of embodiments 15 and 16, wherein $OD_F$ is at least 0.1 mm, at least 1 mm, at least 5 mm, at least 10 mm, at least 20 mm, at least 50 mm, at least 75 mm, at least 100 mm, or at least 150 mm.

Embodiment 18. The bearing or assembly of any one of the preceding embodiments, wherein the generally cylindrical sidewall includes a gap extending in a generally axial direction, the gap defining first and second circumferential edges of the generally cylindrical sidewall.

Embodiment 19. The bearing or assembly of embodiment 18, wherein the gap is closed.

Embodiment 20. The bearing or assembly of any one of the preceding embodiments, wherein a radius of curvature between a first axial end of the feature and the generally cylindrical sidewall is less than 100 mm, less than 50 mm, less than 10 mm, or less than 1 mm.

Embodiment 21. The bearing or assembly of any one of embodiments 2-20, wherein D is at least 0.01 mm, at least 0.1 mm, at least 1 mm, at least 2 mm, at least 3 mm, at least 4 mm, at least 5 mm, at least 10 mm, at least 20 mm, at least 50 mm, or at least 100 mm.

Embodiment 22. The bearing or assembly of any one of the preceding embodiments, wherein the generally cylindrical sidewall has a first axial end and a second axial end, wherein the flange is disposed at the second axial end of the generally cylindrical sidewall, and wherein a distance between the first axial end of the generally cylindrical sidewall and the first axial end of the feature is different from a distance between the second axial end of the feature and the second axial end of the generally cylindrical sidewall.

Embodiment 23. The bearing or assembly of embodiment 22, wherein the distance between the first axial end of the generally cylindrical sidewall and the first axial end of the feature is greater than the distance between the second axial end of the feature and the second axial end of the generally cylindrical sidewall.

Embodiment 24. An assembly comprising:
a first component comprising an aperture;
a second component coaxial with respect to the first component; and
a bearing disposed axially between the first and second components and at least partially within the aperture of the first component,
wherein the first and second components are spaced apart from one another by a distance, D, and wherein the bearing is visible from a side elevation view along the entire distance, D.

Embodiment 25. The assembly of embodiment 24, wherein the first and second components are moveable with respect to one another, such as rotatable with respect to one another.

Embodiment 26. The assembly of any one of embodiments 24 and 25, wherein the bearing comprises:
a generally cylindrical sidewall;

a feature projecting radially outward from the generally cylindrical sidewall; and a flange disposed at an axial end of the generally cylindrical sidewall.

Embodiment 27. The assembly of any one of embodiments 24-26, wherein a nearest distance between the feature and the flange is approximately equal to D.

Embodiment 28. The assembly of any one of embodiments 24-27, wherein at least a portion of the flange and feature are visible from a side elevation view.

Embodiment 29. The assembly of any one of embodiments 24-28, wherein the bearing comprises a low friction layer contacting at least one of the first and second components.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. A bearing comprising:
a generally cylindrical sidewall having a thickness, $t_{SW}$;
a feature projecting radially outward from the generally cylindrical sidewall, wherein the feature has an axial height of at least about $2.0 t_{SW}$; and
a flange disposed at an axial end of the generally cylindrical sidewall and spaced apart from the feature, wherein the generally cylindrical sidewall has a first axial end and a second axial end, wherein the flange is disposed at the second axial end of the generally cylindrical sidewall, and wherein a distance between the first axial end of the generally cylindrical sidewall and a first axial end of the feature is different from a distance between a second axial end of the feature and the second axial end of the generally cylindrical sidewall.

2. The bearing of claim 1, wherein the generally cylindrical sidewall comprises a substrate and a low friction layer disposed along at least a portion of the substrate.

3. The bearing of claim 2, wherein the substrate has first and second major surfaces spaced apart from each other by a distance, and wherein the low friction layer is disposed along one of the first and second major surfaces.

4. The bearing of claim 3, wherein the low friction layer is disposed along the entire first major surface, the entire second major surface, or a combination thereof.

5. The bearing of claim 1, wherein the low friction layer is disposed along an inner surface of the generally cylindrical sidewall, wherein the low friction layer is disposed along an outer surface of the generally cylindrical sidewall, or a combination thereof.

6. The bearing of claim 1, wherein the low friction layer comprises a polymer.

7. An assembly comprising:
a first component;
a second component coaxial with respect to the first component; and
a bearing comprising:
a generally cylindrical sidewall,
a feature projecting radially outward from the sidewall, the feature having a first axial end and a second axial end, and
a flange disposed at an axial end of the generally cylindrical sidewall, wherein the flange is closer to the second axial end of the feature than the first axial end of the feature, and wherein an outermost surface of the flange is spaced apart from the first axial end of the feature by a distance, D, as measured in a direction parallel with a central axis of the bearing,
wherein the first component is disposed adjacent to the first axial end of the feature, wherein the second component is disposed adjacent to the outermost surface of the flange, and wherein the second component is spaced apart from the first component by the distance, D, wherein the generally cylindrical sidewall has a first axial end and a second axial end, wherein the flange is disposed at the second axial end of the generally cylindrical sidewall, and wherein a distance between the fist axial end of the generally cylindrical sidewall and the first axial end of the feature is different from a distance between the second axial end of the feature and the second axial end of the generally cylindrical sidewall.

8. The assembly of claim 7, wherein the first component comprises a body defining an aperture, and wherein the bearing is at least partially disposed in the aperture.

9. The assembly of claim 8 wherein the diameter of the aperture is less than an outermost diameter of the feature.

10. The assembly of claim 7, wherein the first component contacts the first axial end of the feature.

11. The assembly of claim 7, wherein the second component contacts the outermost surface of the flange.

12. The assembly of claim 7, wherein the first and second components are moveable with respect to one another.

13. The assembly of claim 7, wherein the generally cylindrical sidewall includes a gap extending in a generally axial direction, the gap defining first and second circumferential edges of the generally cylindrical sidewall.

14. The assembly of claim 13, wherein the gap is closed.

15. The assembly of claim 7, wherein the distance between the first axial end of the generally cylindrical sidewall and the first axial end of the feature is greater than the distance between the second axial end of the feature and the second axial end of the generally cylindrical sidewall.

16. An assembly comprising:
a first component comprising an aperture;
a second component coaxial with respect to the first component; and
a bearing disposed axially between the first and second components and at least partially within the aperture of the first component,
wherein the first and second components are spaced apart from one another by a distance, D, and wherein the bearing is visible from a side elevation view along the entire distance, D, wherein the bearing comprises:
a generally cylindrical side wall having a first axial end a second axial end,
a feature projecting radially outward from the sidewall, the feature having a first axial end and a second axial end, and
a flange disposed at an axial end of the generally cylindrical sidewall, wherein the flange is disposed at the second axial end of the generally cylindrical sidewall, and wherein a distance between the first axial end of the generally cylindrical sidewall and the first axial end of the feature is different from a distance between the second axial end of the feature and the second axial end of the generally cylindrical sidewall.

17. The assembly of claim 16, wherein the first and second components are moveable with respect to one another.

18. The assembly of claim 16, wherein the bearing comprises a low friction layer contacting at least one of the first and second components.

* * * * *

UNITED STATES PATENT AND TRADEMARK OFFICE
CERTIFICATE OF CORRECTION

PATENT NO.         : 10,228,016 B2
APPLICATION NO.    : 15/618212
DATED              : March 12, 2019
INVENTOR(S)        : Juergen Hartman et al.

Page 1 of 1

It is certified that error appears in the above-identified patent and that said Letters Patent is hereby corrected as shown below:

In the Claims

Column 12, Claim 7, Line 46, please delete "fist" and insert therefor --first--.

Column 13, Claim 16, Line 17, please delete "side wall" and insert therefor --sidewall--.

Signed and Sealed this
Twenty-seventh Day of August, 2019

Andrei Iancu
*Director of the United States Patent and Trademark Office*